(12) United States Patent
Erinjippurath et al.

(10) Patent No.: US 9,720,231 B2
(45) Date of Patent: Aug. 1, 2017

(54) DISPLAY, IMAGING SYSTEM AND CONTROLLER FOR EYEWEAR DISPLAY DEVICE

(71) Applicant: Dolby Laboratories Licensing Corporation, San Francisco, CA (US)

(72) Inventors: Gopal Erinjippurath, San Francisco, CA (US); Thao D. Hovanky, San Francisco, CA (US); Andrew Healy, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 254 days.

(21) Appl. No.: 14/038,561

(22) Filed: Sep. 26, 2013

(65) Prior Publication Data

US 2014/0085190 A1    Mar. 27, 2014

Related U.S. Application Data

(60) Provisional application No. 61/706,050, filed on Sep. 26, 2012.

(51) Int. Cl.
*G02B 27/01* (2006.01)
*G06F 3/01* (2006.01)

(52) U.S. Cl.
CPC ......... *G02B 27/0172* (2013.01); *G06F 3/012* (2013.01); *G02B 2027/011* (2013.01); *G02B 2027/014* (2013.01); *G02B 2027/0138* (2013.01); *G02B 2027/0159* (2013.01); *G02B 2027/0163* (2013.01)

(58) Field of Classification Search
CPC ............... G06F 3/012; G02B 27/0172; G02B 2027/0159; G02B 2027/0163; G02B 2027/011; G02B 2027/014; G02B 2027/0138
See application file for complete search history.

(56) References Cited

U.S. PATENT DOCUMENTS

| 5,162,828 | A | 11/1992 | Furness |
| 5,742,264 | A | 4/1998 | Inagaki |
| 5,751,494 | A | 5/1998 | Takahashi |

(Continued)

FOREIGN PATENT DOCUMENTS

| CN | 101285941 | 10/2008 |
| CN | 101419339 | 4/2009 |

(Continued)

*Primary Examiner* — Towfiq Elahi

(57) ABSTRACT

Several embodiments of a personal display system are disclosed that comprises modular and extensible features to affect a range of user/wearer/viewer experiences. In one embodiment, the personal display system comprises a frame; a processor capable of sending image data signals and control signals; a display; an optic system, said optic system optically coupled to said at least one display; and a set of actuators, said actuators coupled to said frame and in communication with the optic system, such that said set of actuators are capable of moving the optic system, according to control signals sent from said processor. In another embodiment, a method for pre-warping input image data under processor control and according to ambient conditions, such as light and temperature, is disclosed.

7 Claims, 17 Drawing Sheets

(56) References Cited

U.S. PATENT DOCUMENTS

| | | | |
|---|---|---|---|
| 6,097,352 A * | 8/2000 | Zavracky | G02B 27/017 345/7 |
| 6,097,543 A | 8/2000 | Rallison | |
| 6,204,974 B1 | 3/2001 | Spitzer | |
| 6,337,492 B1 | 1/2002 | Jones | |
| 6,384,982 B1 | 5/2002 | Spitzer | |
| 6,388,797 B1 | 5/2002 | Lipton | |
| 6,618,099 B1 | 9/2003 | Spitzer | |
| 6,762,801 B2 | 7/2004 | Weiss | |
| 6,947,219 B1 | 9/2005 | Ou | |
| 7,068,258 B2 * | 6/2006 | Cone et al. | 345/169 |
| 7,148,860 B2 | 12/2006 | Kooi | |
| 7,249,846 B2 | 7/2007 | Grand | |
| 7,345,822 B1 | 3/2008 | Yamazaki | |
| 7,350,919 B2 | 4/2008 | Hillis | |
| 7,391,575 B2 | 6/2008 | Inoguchi | |
| 7,403,337 B2 | 7/2008 | Ou | |
| 7,410,255 B2 | 8/2008 | Nakazawa | |
| 7,499,217 B2 | 3/2009 | Cakmacki | |
| 7,639,208 B1 * | 12/2009 | Ha et al. | 345/8 |
| 7,924,506 B2 | 4/2011 | Rieger | |
| 8,123,352 B2 | 2/2012 | Matsumoto | |
| 8,125,716 B2 | 2/2012 | Bryant | |
| 8,403,489 B2 | 3/2013 | Richards | |
| 8,411,137 B2 | 4/2013 | Jacobs | |
| 8,459,796 B2 | 6/2013 | Richards | |
| 8,503,078 B2 | 8/2013 | Richards | |
| 8,537,463 B2 | 9/2013 | Richards | |
| 2002/0148545 A1 | 10/2002 | Nanni | |
| 2004/0070825 A1 | 4/2004 | Charlesworth | |
| 2005/0041297 A1 | 2/2005 | He | |
| 2005/0174651 A1 | 8/2005 | Spitzer | |
| 2006/0098087 A1 * | 5/2006 | Brandt | G02B 27/017 348/61 |
| 2006/0119794 A1 * | 6/2006 | Hillis | G02B 3/14 351/205 |
| 2007/0069976 A1 | 3/2007 | Willins | |
| 2007/0273610 A1 | 11/2007 | Baillot | |
| 2008/0218501 A1 * | 9/2008 | Diamond | G09G 3/22 345/207 |
| 2009/0073082 A1 | 3/2009 | Yoshikawa | |
| 2009/0213038 A1 | 8/2009 | Huang | |
| 2010/0060857 A1 | 3/2010 | Richards | |
| 2010/0109977 A1 | 5/2010 | Yamazaki | |
| 2010/0245585 A1 | 9/2010 | Fisher | |
| 2010/0259673 A1 | 10/2010 | Russell | |
| 2010/0321409 A1 | 12/2010 | Komori | |
| 2011/0018903 A1 | 1/2011 | Lapstun | |
| 2011/0221793 A1 * | 9/2011 | King et al. | 345/690 |
| 2011/0248904 A1 | 10/2011 | Miyawaki | |
| 2012/0032874 A1 | 2/2012 | Mukawa | |
| 2012/0044571 A1 | 2/2012 | Mukawa | |

FOREIGN PATENT DOCUMENTS

| | | |
|---|---|---|
| CN | 201278061 | 7/2009 |
| EP | 1202104 | 5/2002 |
| GB | 2299873 | 10/1996 |
| GB | 2376397 | 12/2002 |
| JP | 2000-214408 | 8/2000 |
| JP | 2003-279882 | 10/2003 |
| WO | 2013/086169 | 6/2013 |
| WO | 2013/096052 | 6/2013 |

* cited by examiner

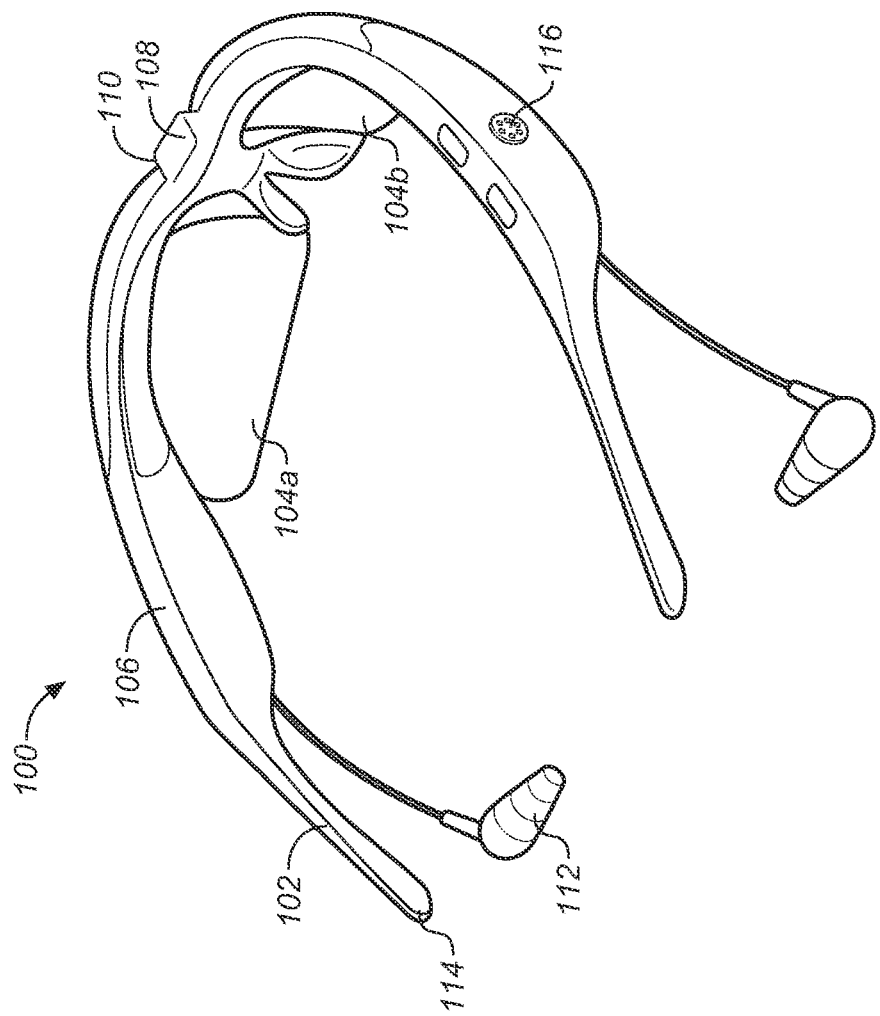

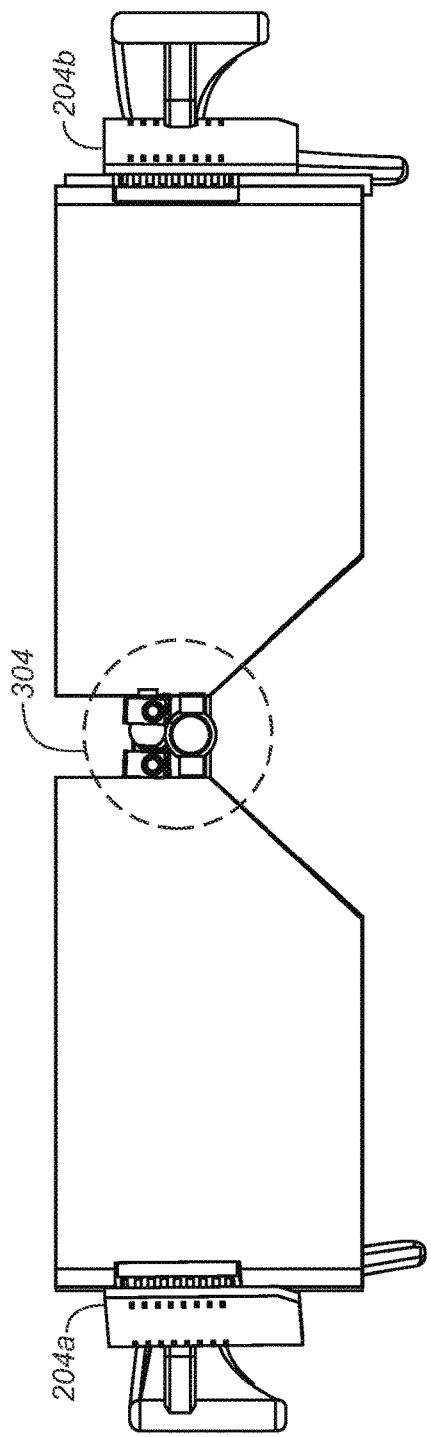
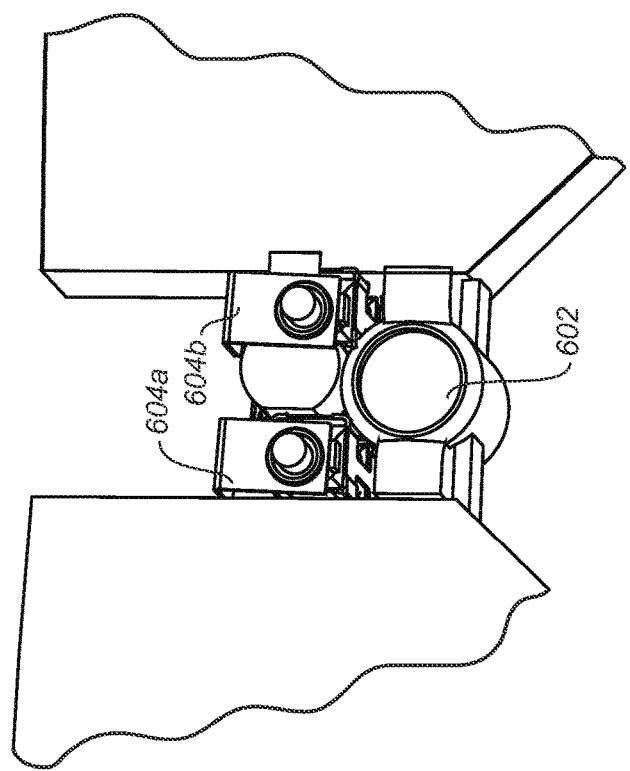
FIG. 6A
FIG. 6B

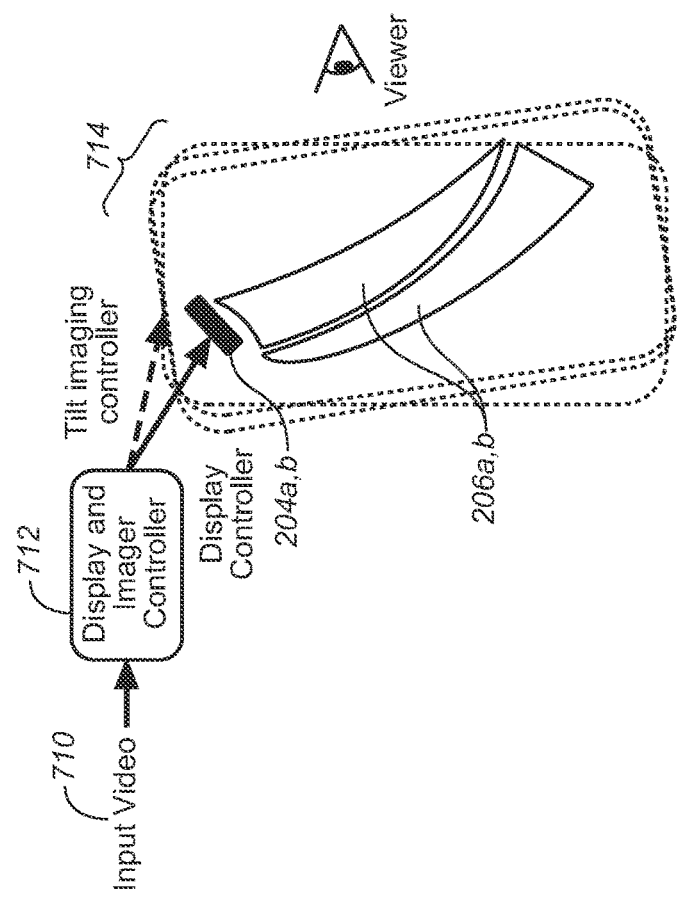
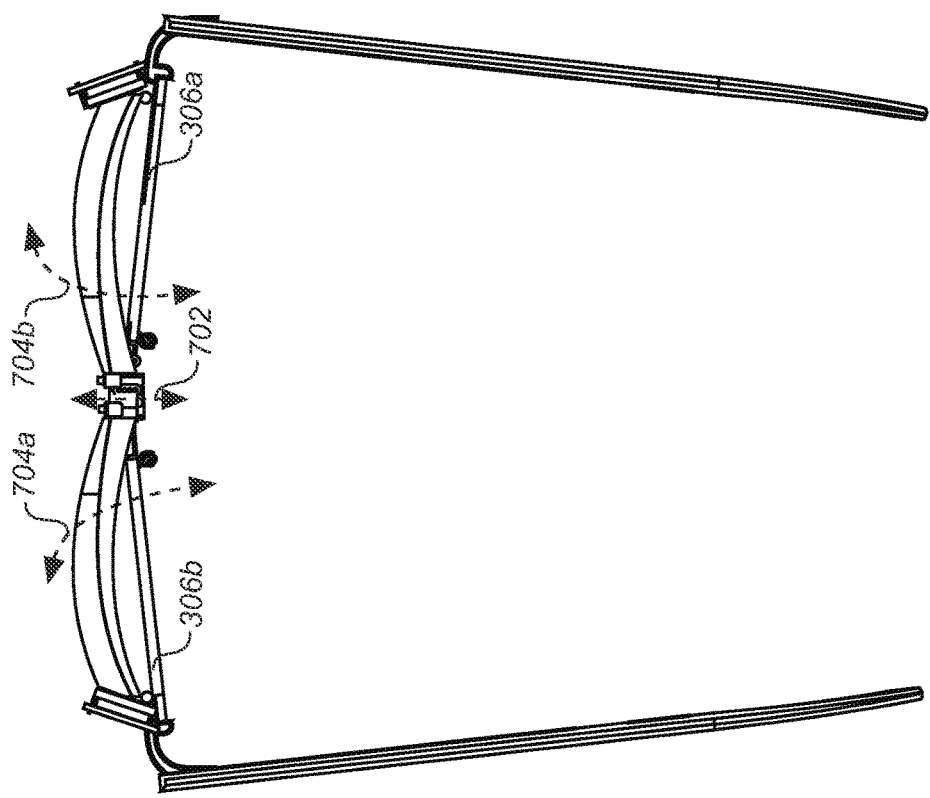
FIG. 7A
FIG. 7B

DISPLAY, IMAGING SYSTEM AND CONTROLLER FOR EYEWEAR DISPLAY DEVICE

CROSS REFERENCE TO RELATED APPLICATIONS

This application claims the benefit of U.S. Provisional Application No. 61/706,050 filed on Sep. 26, 2012, which is hereby incorporated by reference in its entirety.

TECHNICAL FIELD

The present invention relates to displays systems and, more particularly, to novel personal display systems comprising versatile and extensible features.

BACKGROUND

In the field of wearable personal glasses, it is known to create personal 3D displays comprising glasses that affect a 3D viewing experience—either leveraging polarization effects, spectral separation effects, or the like. Such personal displays are disclosed further in co-owned: (1) United States Patent Application Publication Number 20100060857 entitled "SYSTEM FOR 3D IMAGE PROJECTIONS AND VIEWING"; (2) United States Patent Application Publication Number 20100066976 entitled "METHOD AND SYSTEM FOR SHAPED GLASSES AND VIEWING 3D IMAGES"; (3) United States Patent Application Publication Number 20100067108 entitled "METHOD AND SYSTEM FOR SHAPED GLASSES AND VIEWING 3D IMAGES"; (4) United States Patent Application Publication Number 20100073769 entitled "METHOD AND SYSTEM FOR SHAPED GLASSES AND VIEWING 3D IMAGES"; (5) United States Patent Application Publication Number 20110205494 entitled "SPECTRAL SEPARATION FILTERS FOR 3D STEREOSCOPIC D-CINEMA PRESENTATION"; (6) United States Patent Application Publication Number 20100013911 entitled "DUAL PROJECTION SYSTEM WITH INVERSELY SYNCHRONIZED CHANNEL PROJECTIONS"—all of which are hereby incorporated by reference in their entirety.

Other references to personal head mounted displays are known such as: (1) United States Patent Application Publication Number 20110248904 entitled "HEAD MOUNTED DISPLAY AND OPTICAL POSITION ADJUSTMENT METHOD OF THE SAME"; (2) United States Patent Application Publication Number 20110221793 entitled "ADJUSTABLE DISPLAY CHARACTERISTICS IN AN AUGMENTED REALITY EYEPIECE"; (3) U.S. Pat. No. 6,204,974 entitled "COMPACT IMAGE DISPLAY SYSTEM FOR EYEGLASSES OR OTHER HEAD-BORNE FRAMES"; (4) United States Patent Application Publication Number 20050174651 entitled "BINOCULAR VIEWING SYSTEM"; (5) United States Patent Application Publication Number 20070069976 entitled "METHOD AND SYSTEM FOR INTERFACE BETWEEN HEAD MOUNTED DISPLAY AND HANDHELD DEVICE"; (6) U.S. Pat. No. 5,742,264 entitled "HEAD-MOUNTED DISPLAY"; (7) United States Patent Application Publication Number 20100245585 entitled "HEADSET-BASED TELECOMMUNICATIONS PLATFORM"; (8) U.S. Pat. No. 6,388,797 entitled "ELECTROSTEREOSCOPIC EYEWEAR"; (9) U.S. Pat. No. 6,097,543 entitled "PERSONAL VISUAL DISPLAY"; (10) U.S. Pat. No. 6,384,982 entitled "COMPACT IMAGE DISPLAY SYSTEM FOR EYEGLASSES OR OTHER HEAD-BORNE FRAMES"; (11) U.S. Pat. No. 6,618,099 entitled "DISPLAY DEVICE WITH EYEPIECE ASSEMBLY AND DISPLAY ON OPTO-MECHANICAL SUPPORT"; (12) U.S. Pat. No. 7,499,217 entitled "IMAGING SYSTEMS FOR EYEGLASS-BASED DISPLAY DEVICES"; (13) U.S. Pat. No. 5,162,828 entitled "DISPLAY SYSTEM FOR A HEAD MOUNTED VIEWING TRANSPARENCY"; (14) U.S. Pat. No. 7,249,846 entitled "EYEWEAR WITH AN IMAGE PROJECTED OFF OF AN UNASSISTED EYEWEAR LENS TO THE USER"; (15) U.S. Pat. No. 6,337,492 entitled "SERIALLY-CONNECTED ORGANIC LIGHT EMITTING DIODE STACK HAVING CONDUCTORS SANDWICHING EACH LIGHT EMITTING LAYER"; (16) U.S. Pat. No. 7,068,258 entitled "PORTABLE COMMUNICATION DEVICE WITH VIRTUAL IMAGE DISPLAY MODULE"—all of which are herein incorporated by reference in their entirety.

SUMMARY

Several embodiments of display systems and methods of their manufacture and use are herein disclosed.

In one embodiment, a personal display system comprises a one or more modular parts wherein such modularity affects a wide range of user/wearer/viewer experiences.

Several embodiments of a personal display system are disclosed that comprises modular and extensible features to affect a range of user/wearer/viewer experiences. In one embodiment, the personal display system comprises a frame; a processor capable of sending image data signals and control signals; a display; an optic system, said optic system optically coupled to said at least one display; and a set of actuators, said actuators coupled to said frame and in communication with the optic system, such that said set of actuators are capable of moving the optic system, according to control signals sent from said processor.

In another embodiment, a method for pre-warping input image data under processor control and according to ambient conditions, such as light and temperature, is disclosed.

Other features and advantages of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIG. 1 shows one embodiment of a personal display system made in accordance with the principles of the present application.

FIGS. 6A, 6B, 6C and 6D shows other perspective views of various embodiments of a personal display system, respectively.

FIGS. 7A and 7B shows one embodiment of possible motion that may be effected by actuators under controller operation.

DETAILED DESCRIPTION

Figure 3:
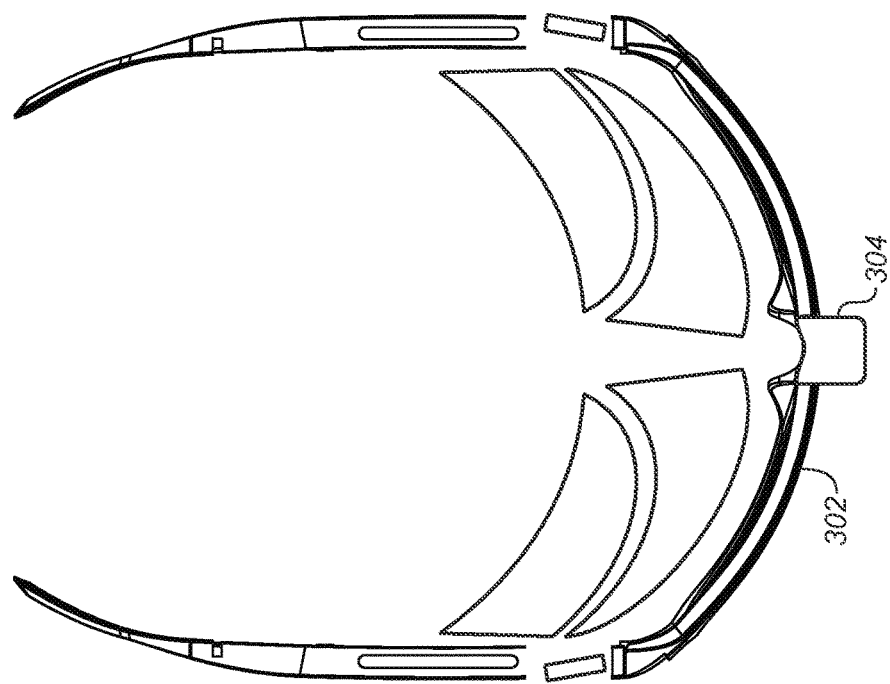
FIG. 3 shows the embodiment of a personal display system as in FIG. 2 further comprising a front frame and front element.

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers. A component may also be intended to refer to a communications-related entity, either hardware, software (e.g., in execution), and/or firmware and may further comprise sufficient wired or wireless hardware to affect communications.

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Introduction

In the field of wearable personal display systems, some such display systems affect a 2D image on the glasses—to cover either the entire field of view or some portion thereof. Other such display systems affect a 3D image as light is transmitted through the glasses having some state—e.g. polarization or spectral separation or the like—that may be leveraged to produce such 3D effects.

In one embodiment of the present application, a head-mounted personal display system is disclosed. This embodiment comprises a head-wearable frame that provides a versatile, extensible frame and/or structure by which at least one side piece, different lenses and/or front pieces may be added, mated, changed, swapped or otherwise replaced to affect images presented to the user via a emissive display—or a transmissive portion with possibly polarization or spectral separation features for the presentation of 3D effects.

Other optional features are disclosed in other embodiments. For example, one such embodiment of a display system may comprise a pair of detachable displays (one for each eye, right and left), a head wear frame, audio/video modules, wireless communication unit and power electronics.

FIG. 1 shows one embodiment of a head-mounted personal display system 100. Display system 100 may comprise frame 102, a pair of glasses and/or optical pieces 104a and 104b, compartment 106, camera sensor 108, microphone (MIC) 116, earphone 112, proximate sensor 114. As will be explained in greater detail below, the present application encompasses a number and variety of embodiments of such display systems—e.g., with some functional blocks optional and other functional blocks additional to the embodiment shown in FIG. 1.

Display system 100, when worn by a user/wearer, may receive both visual and/or auditory signals to create a particular sensory impression. For example, displays 104a and 104b may provide visual signals to the user/wearer that relates to the immediate proximity and/or surrounding of the user/wearer, as captured, e.g., by camera sensor(s) 108 (possibly installed in a front element 110) or proximity sensor(s) 114, integrated into the display system 100. In another embodiment, the visual signals may be related to image data that may be sent to the display system 100 in a wired or wireless communication link. In another embodiment, visual signals may relate to image data that is created by a processor (for example, computer graphics) that is tightly, loosely, or not at all, bound to the user/wearer's surrounding. Such a processor and other related electronic and/or processing components may reside in a compartment and/or housing of the display system 100 (such as compartment 106).

In one embodiment, displays 104a and/or 104b may comprise glasses that afford the user/wearer a view of the real-world surroundings. As will be discussed further herein, such glasses may be in proximity to displays and/or optic systems, possibly in a variety of orientations (e.g., side/horizontal or top/vertical orientation). In some embodiments, these displays and/or optic systems may further be movably attached to the frame (either directly or indirectly)—in order to move the display and/or optic systems substantially out of the view of the user/wearer to afford a better view of the real-world, or, to allow adjustment motions (via actuators) in order to provide a better rendering of images produced by the display and/or optic system. In other embodiments, the display and/or optic system may not be allowed gross movement (i.e., is substantially fixedly attached to the frame); but may allow for some adjustment motion via actuators in order to better render an image to the user/wearer.

Figure 2:
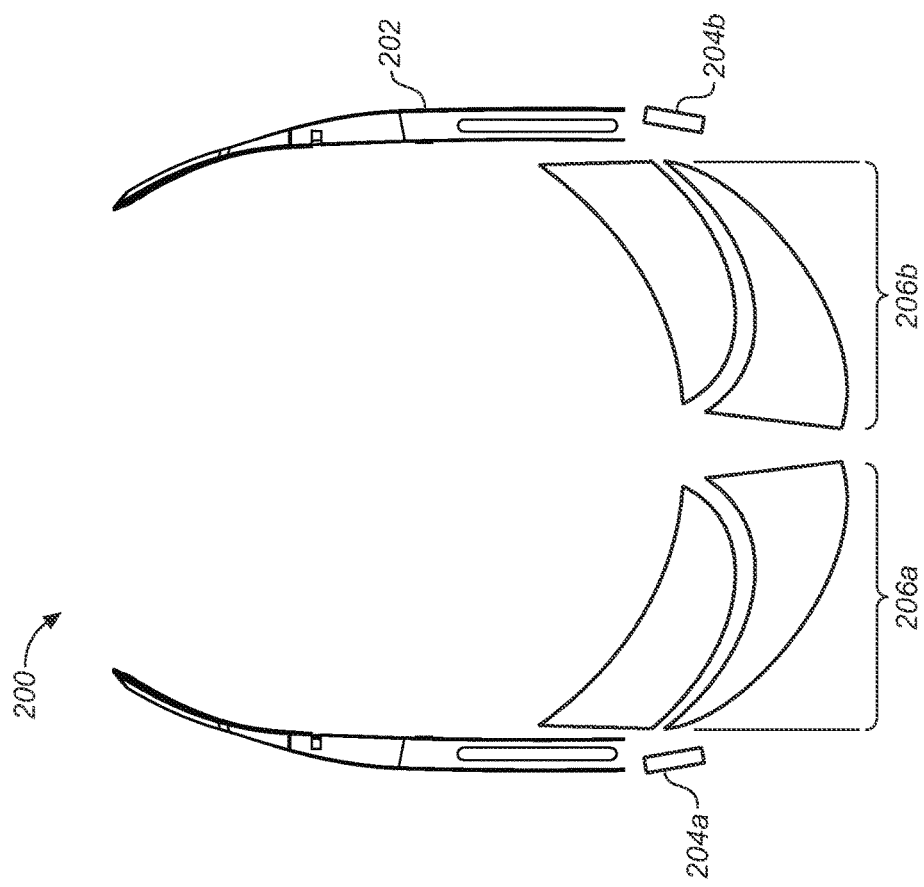
FIG. 2 shows a top view of one embodiment of a personal display system as made in accordance with the principles of the present application.

In one embodiment, the personal display system may comprise one optical piece (possibly, covering both eyes in a visor-like fashion—or covering only one eye) or two optical pieces (possibly, covering each a left eye and a right eye, as depicted in FIGS. 1 and 2). As disclosed further herein, optical pieces may comprise at least a portion having active emissive elements for the presentation of virtual images to the user/wearer. In other embodiments, optical pieces may comprise at least a portion of a transmissive portion where the transmissive portion may have features for modulating light (e.g., from real world objects) transmitting there through. In the case where the optical pieces comprise both a transmissive portion and active emissive elements, the virtual images and real world images may interact according to user/wearer commands, image data, metadata or processing components in side pieces (as discussed further herein).

As mentioned, in one embodiment, one of the side pieces may be capable of being mated with frame of the personal display system. Such a side piece may comprise components—e.g., for processing and/or communications. These components may perform a number of functions, such as: inputting image data from an external source (in a wireless or wired manner), processing such image data according to user/wearer commands, external sources or its own internal processing components. It is possible in such a configuration for the personal display system to present a view of real world images, virtual images and/or a combination of both real world images and virtual images. Such virtual images may interact with real world images and overlay such real world images with metadata or otherwise interact with such real world images.

Display system 100 may input auditory signals to the user/wearer via earpiece(s) 112 and output speech from the user/wearer via MIC 116. The input auditory signals may relate—tightly or loosely—to the visual signals supplied to the user/wearer. In one embodiment, an antenna suitable for transmitting data from the user/wearer to a wireless access point may be incorporated into the microphone (or another suitable place on the frame) such that the amount of radiation emanating from the antenna will be a distance from the user/wearer's head, skull and/or brain to reduce any risk of radiation induced cancer.

In yet another embodiment, the personal display system may comprise a frame with optical piece(s) that comprise transmissive portions—comprising features that affect one of the many visual effects, e.g., polarization features, spectral separation features, other 3D features or the like. In such an embodiment, the front piece may comprise optical pieces that at least a portion of these optical pieces comprise active emissive elements. In this embodiment, the front piece may be in communication or otherwise electrical connection with the processing components in the side piece may interact with these active emissive elements in the front piece. For the purposes of the present application, it may suffice that the user/wearer have the option (possibly, by way of added, swapped or modular parts) of being presented with virtual images from the active emissive elements or a combination of real world images (from the transmissive part of the display system) and virtual images (from the emissive part of the display system).

As will be discussed in greater detail, applications of this system include but not limited to personal and cinematic 3D display, text-based, video and audio-based communications, navigation, gaming, augmented, virtual reality and wireless head-up display utilizing advanced user interfaces such as gaze tracking, body motion and gestures.

In the personal 3D display system disclosed herein, a viewer can be anywhere while experiences immersive 3D digital cinema, regardless of underlying technology. In one embodiment, the digital cinema server communicates wirelessly to the eyewear and displayed at maximum OLED matrix resolution in a shared viewing experience with an audience. In another embodiment, the personal 3D display system functions as high definition, high dynamic range video displays with built-in surround sound technologies.

First Embodiment

FIG. 2 is a first embodiment 200 of a personal display system that comprises a frame 202, displays (204a and/or 204b) and an optic system (206a and/or 206b). In this embodiment, displays 204a and/or 204b may further comprise microdisplays in any manner known in the art. In particular, displays 204a and/or 204b may comprise microdisplays of OLED, LCD, LCOS, MEMS or other suitable construction—and may be either multicolored or monochrome—and may be constructed in a suitable stacked configuration. It will be appreciated that any type of emissive or transmissive display may suffice and that eyewear glasses may have displays and imaging systems for either one eye or for both eyes.

In one embodiment, optic system 206a and/or 206b may comprise a dual-piece optic system—which in turn may further comprise an imaging prism and pre-distortion prism, as will be described in greater detail herein. As will also be discussed, an image may be formed by displays 204a and/or 204b and, through the optical path formed by the optic system, may be displayed to the user/wearer of the personal display system—e.g., appearing as if formed on the glasses themselves. In this embodiment, the glasses—while comprising the optical path by which the image from the displays may be directed—may also comprise a transparent image of the real world in which the user/wearer is located. One visual effect may be to have a display image superimposed on the real world image—e.g., to enhance the visual and/or informational experience of the user/wearer, as is known in the art of personal display and augmented reality systems.

For user desirability and adoption, it may be desirable that, in at least one embodiment of the personal display system, the following specifications may be met: high frame rate support [e.g., 30-60 fps], high resolution support [e.g., 1920×1080 and above], modular design for replacing optics for different usage scenarios, low power consumption, light weight optics and wireless communication with other devices. In addition, the optical design of the lenses and the positioning of the micro-display relative to the lenses make a significant impact to the performance and the durability of the eyewear design.

FIG. 3 depicts another embodiment of the personal display system as made in accordance with the principles of the present application. In addition to the display system shown in FIG. 2, the display system may further comprise a front frame 302 in which a front element 304 may be affixed, attached or at least located. Front element 304 may optionally comprise a group of potential elements—for example, front element 304 may comprise a forward facing camera. Alternatively and/or additionally, front element 304 may comprise a set of actuators—in order to, e.g., provide movement to the optic system, as will be described in greater detail below.

In various embodiments detailed herein, the micro-display is positioned to the side, above, or in some alignment with, the free form prism optics lenses. In one particular embodiment, an AMOLED based micro-display is used. When the micro-display is turned off, the compensation lens and the imaging prism may tend to cancel each other in action and the result may be an unmodified/unmagnified version of the outside world. Since the micro-display is placed proximal to the imaging prism that provides magnification and may also have a semi-reflective aspherical surface, this may allow for see-through on the outside world and data/image/video overlay in the outside world. As there may be distinct OLED and prism optics in front of each eye, this may be used to drive synchronous video intended for each eye to create a 3D overlay on top of the scene being viewed. For example, a suitable use case of such a system may be to overlay 3D advertisements that are geography centric and relevant to the user on top of a 3D movie in a theater.

In addition, there may be other desirable properties with the micro-display integrated on the side of the frame (rather than at the top of the lenses, as described herein). For example, since the imaging prism is substantially rotationally symmetric, this orientation may allow for the same imaging properties but thereby may allow for higher resolutions and for thinner free form optics. Also, the side orientation for the components of the eyewear frame may allow for higher reliability of the OLED microdisplay that may be sensitive to dust and the external environment.

Figure 4:
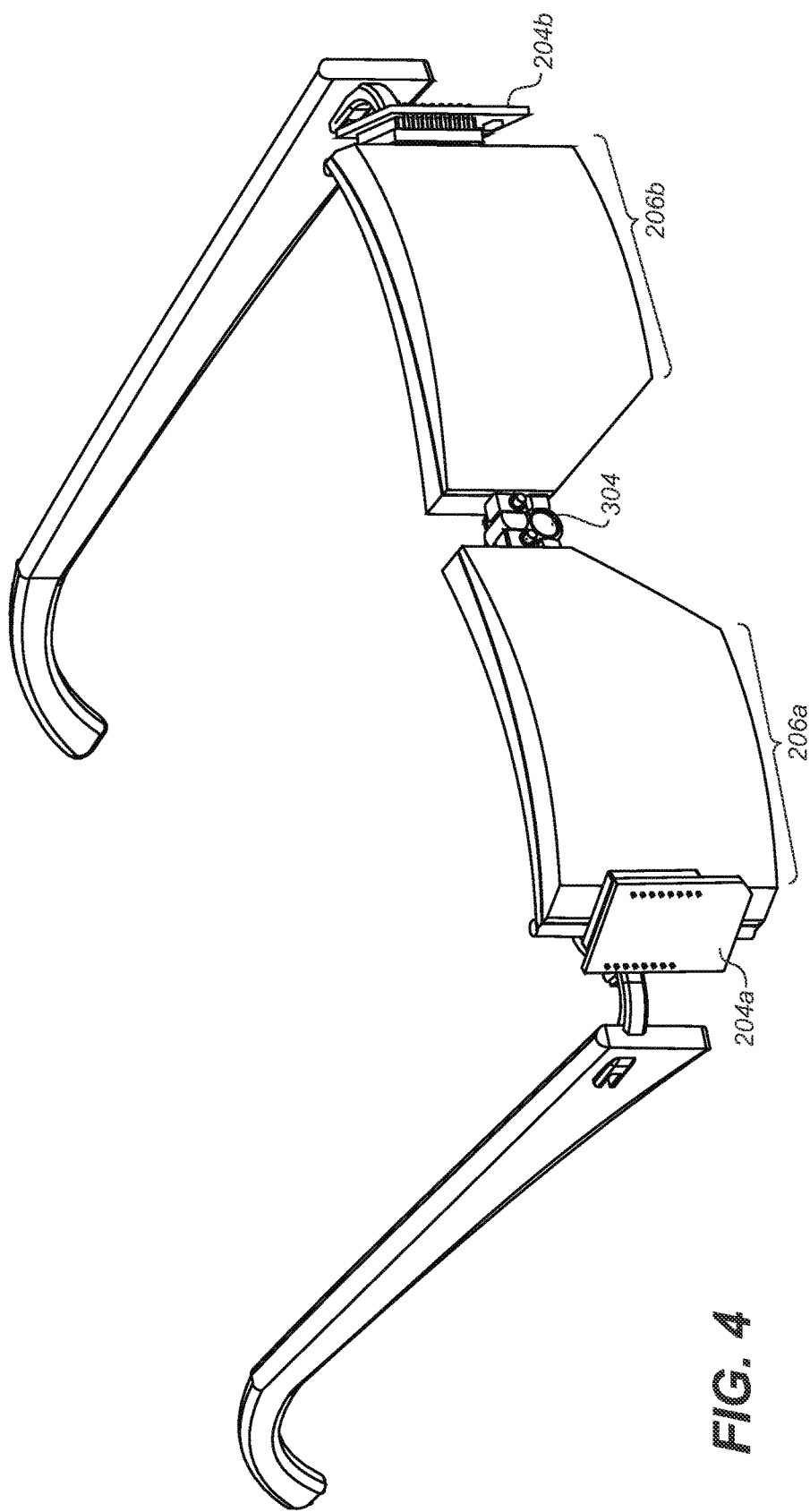
FIG. 4 shows a front, perspective view of one embodiment of a personal display system comprising a display in a side and/or horizontal configuration.

FIG. 4 is another embodiment of the personal display system. As shown in this front perspective view, displays 204a and/or 204b may further comprise actuators (e.g., piezoelectric micro-actuators or the like) that may provide adaptive motions—e.g., pan and/or tilt adjustment motions to the display. These actuators may work together with any other actuators that may be placed in the front element 304. Such adjustments may be either the prime movement to properly render the display or may be fine adjustments made to the primary movement of the optic system 206a and/or 206b. It will be appreciated the personal display system may employ these or other actuators in order to properly render an image to the user/wearer.

Figure 5:
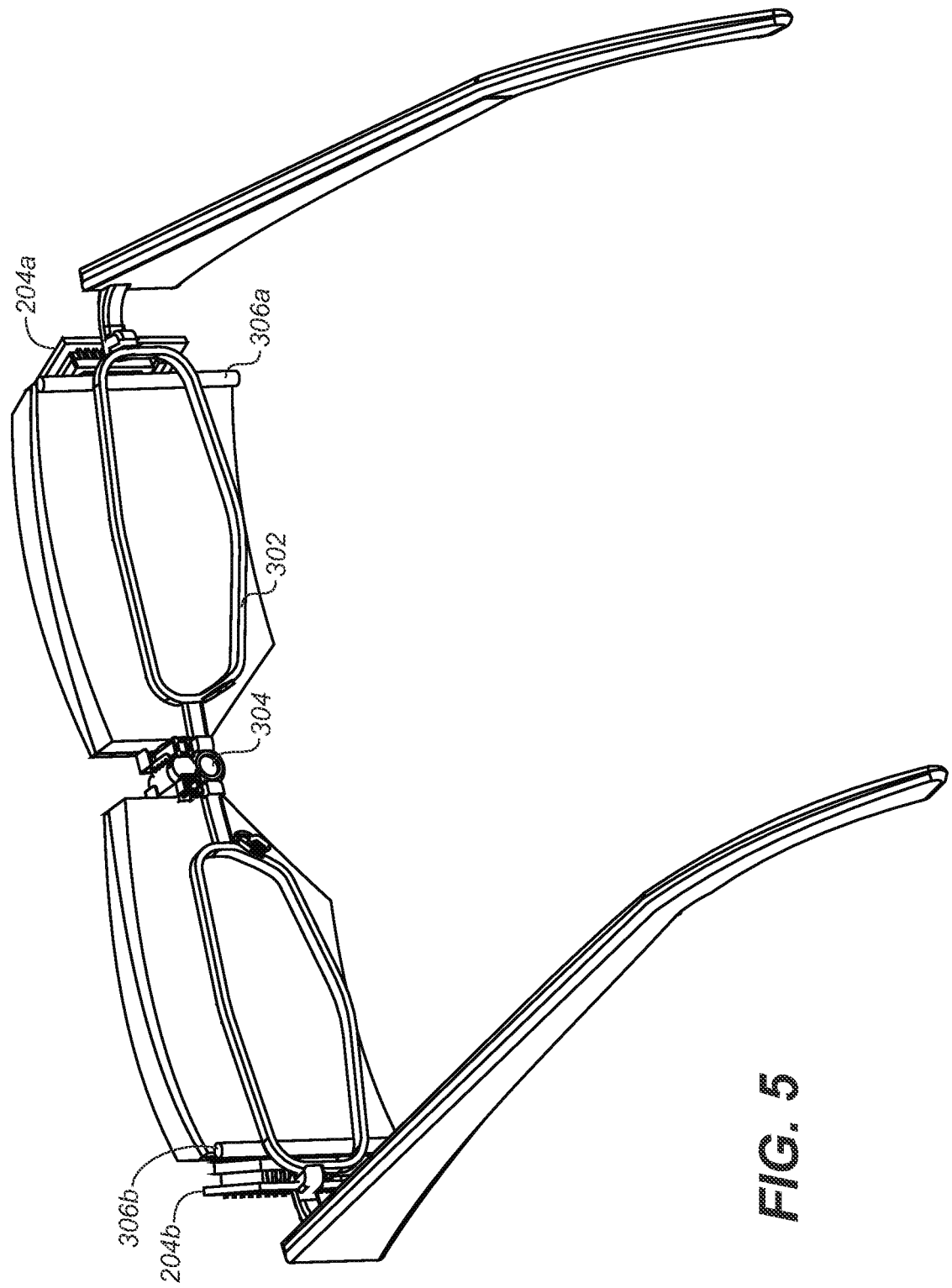
FIG. 5 shows a back, perspective view of one embodiment of a personal display system comprising a front frame and a front element.

FIG. 5 is yet another embodiment of the personal display system. As shown in this rear perspective view, front frame 302 may be situated behind the optic system, with front element 304 placed in between the optic systems and/or glasses, and possibly providing mechanical support for optic systems and/or glasses as well.

Figure 6D:
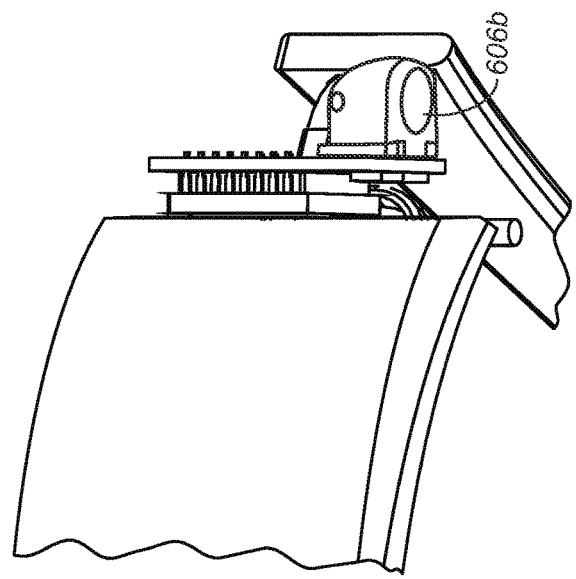
Figure 6C:
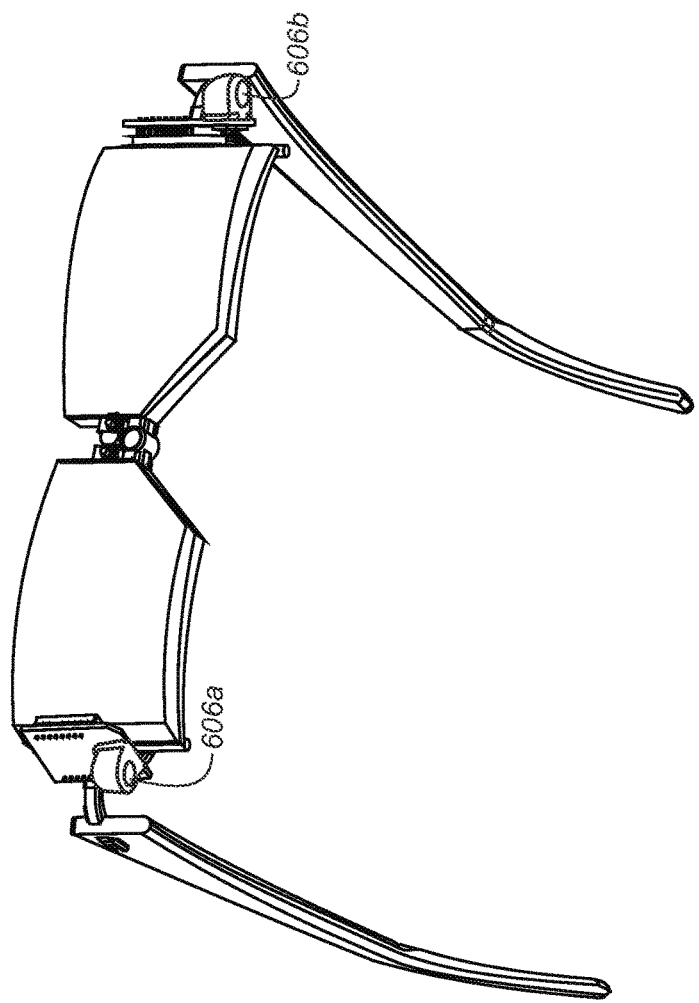

FIGS. 6A through 6D show other perspective views of some embodiments of a personal display system. In FIG. 6A, front element 304 is shown as located between the optic systems and/or glasses (i.e., depending upon whether one or both eyes will be treated to images rendered by a display). In FIG. 6B, a closer perspective view of one embodiment of the front element is displayed. Front element in this embodiment may further comprise a front facing camera 602. In FIG. 6C, there is shown a bottom perspective view— showing one embodiment with a pair of microphones 606a and 606b. In FIG. 6D, it is shown that the microphones may be placed in a downward orientation, so that the speech signals from the user/wearer may be captured with better clarity by the microphone.

Such a front facing camera may capture real world images that are within range of the user/wearer. In addition, this camera may include a depth-sensing capability for the purposes of gesture recognition. This is an example of rear gesture recognition where the gesture sensing apparatus, in this case the integrated depth sensing camera, is located behind the plane of the gesture generation. The images captures by the front facing camera may be re-displayed to the user/wearer, with additional processing and feature. For example, some portion of the real world may be magnified or otherwise processed—and additional data and/or metadata may be superimposed or otherwise associated with the captured images. One possible paradigm example may be the user/wearer in an art gallery and the camera may capture a portion of an art work. This image may be overlain with information about the artist and the technique used to produce the captured effect. Another possible paradigm example is one where the user/wearer is watching a sports game and the overlay can provide statistics/data on the teams that are playing in the game. Another paradigm example is one where the wearer is looking at a presentation and the front facing camera (108) detects objects in the presentation, communicates with other embodiments of the invention and produced an overlay that provides more details and information on the objects in the presentation by working with a remote data server. Other examples are readily available—e.g., a soldier may have a portion of a battlefield scene magnified to identify either friend or foe.

In addition to a front facing camera, front element may also comprise a set (e.g., none, one, two or others) of actuators (e.g., 604a and/or 604b) to provide motion and/or adjustment to the optic system as previously mentioned. FIG. 7A is a top view of one embodiment of a personal display system in which the optic system may be moved by such actuators. Through the action of the actuators, motions 702, 704a and 704b may provide a desired, adaptive tilt to the optic system. Actuators (e.g. piezoelectric device(s) or the like) may be suitable in situations where low power consumption and submicron positioning are desirable. In one embodiment, the actuators may affect the adaptive tilting of the prism optics. For example, linear motion may be achieved by using standing wave, propagating wave or bending motion actuators. The choice of which actuator type (e.g. piezoelectric or the like) may depend on operating frequency and associated displacement, cost and the level of ruggedness required. In another embodiment, the actuators may be able to transmit ultrasonic waves. If the front element further comprises an ultrasonic receiver, then the returned ultrasonic signal may yield position and velocity of nearby objects in proximity to the user/wearer. It will be appreciated that other proximity detectors are possible for the purposes of the present application. In fact, suitable proximity detectors may comprise: capacitive displacement sensor, Doppler effect (sensor based on effect), Eddy-current, inductive, laser rangefinder, magnetic, including magnetic proximity fuse, passive optical (such as charge-coupled devices), passive thermal infrared, photocell (reflective), radar, reflection of ionizing radiation, or sonar (typically active or passive).

These motions may be induced in coordination with input image and/or video data. FIG. 7B depicts the system and techniques for proper rendering of image data via the microdisplays. Input image and/or video 710 may be input into a display and/or image controller 712. Depending upon the desired image to be rendered, controller 712 may calculate the control signals to the actuators of the displays (e.g. 204 a,b) and/or the optic systems (e.g., 206a,b). Such coordinated motions 714 would be desired to properly render the image to the user/wearer.

Second Embodiment

Figure 8:
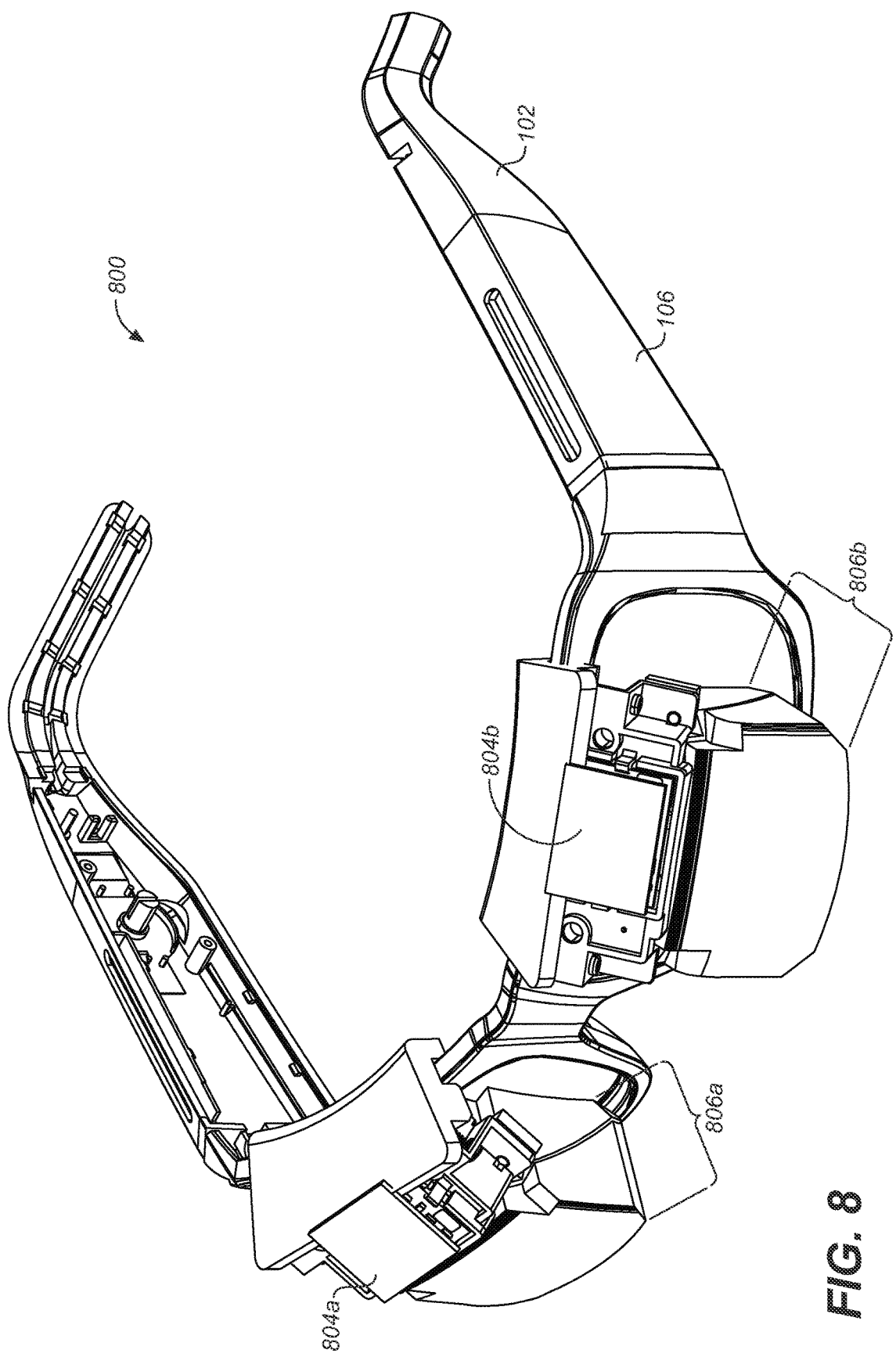
FIG. 8 shows another embodiment of a personal display system made in accordance with the principles of the present application further comprising a display and optic system in a top and/or vertical configuration.

FIG. 8 depicts an alternative embodiment to the personal display system. Personal display system 800 may comprise a frame 102, a controller compartment 106—but instead of a side (or horizontal) orientation of the display, displays 804a and/or 804b may be situated in a top (or vertical) orientation to the display glasses. Optic systems 806a and/or 806b may be placed over the glasses—e.g., to either cover all or only a portion of the real-world view. In other embodiments, one display and optic system may be placed to cover one eye; or, in another embodiment, a visor may be placed over the eyes and one or more displays may produce an image for the user/wearer through a single optic system.

Figure 9:
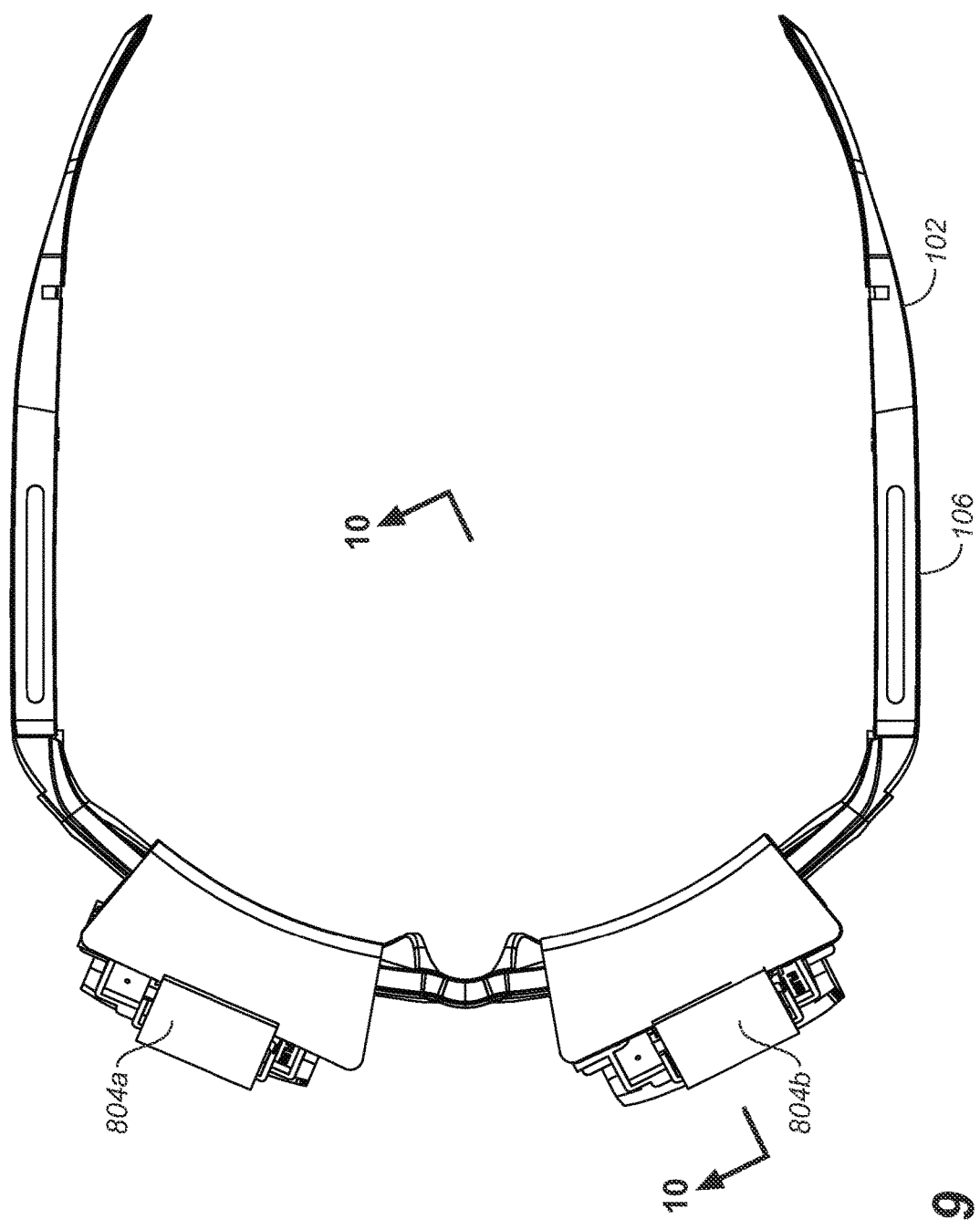
FIG. 9 is a top view of the embodiment as shown in FIG. 8.

FIG. 9 gives a top view of this embodiment of a personal display system. As may be seen, the displays and/or optic systems may be individually placed before an eye—or lifted out of the way, to give one or both eyes a clear view of the real world.

Figure 10:
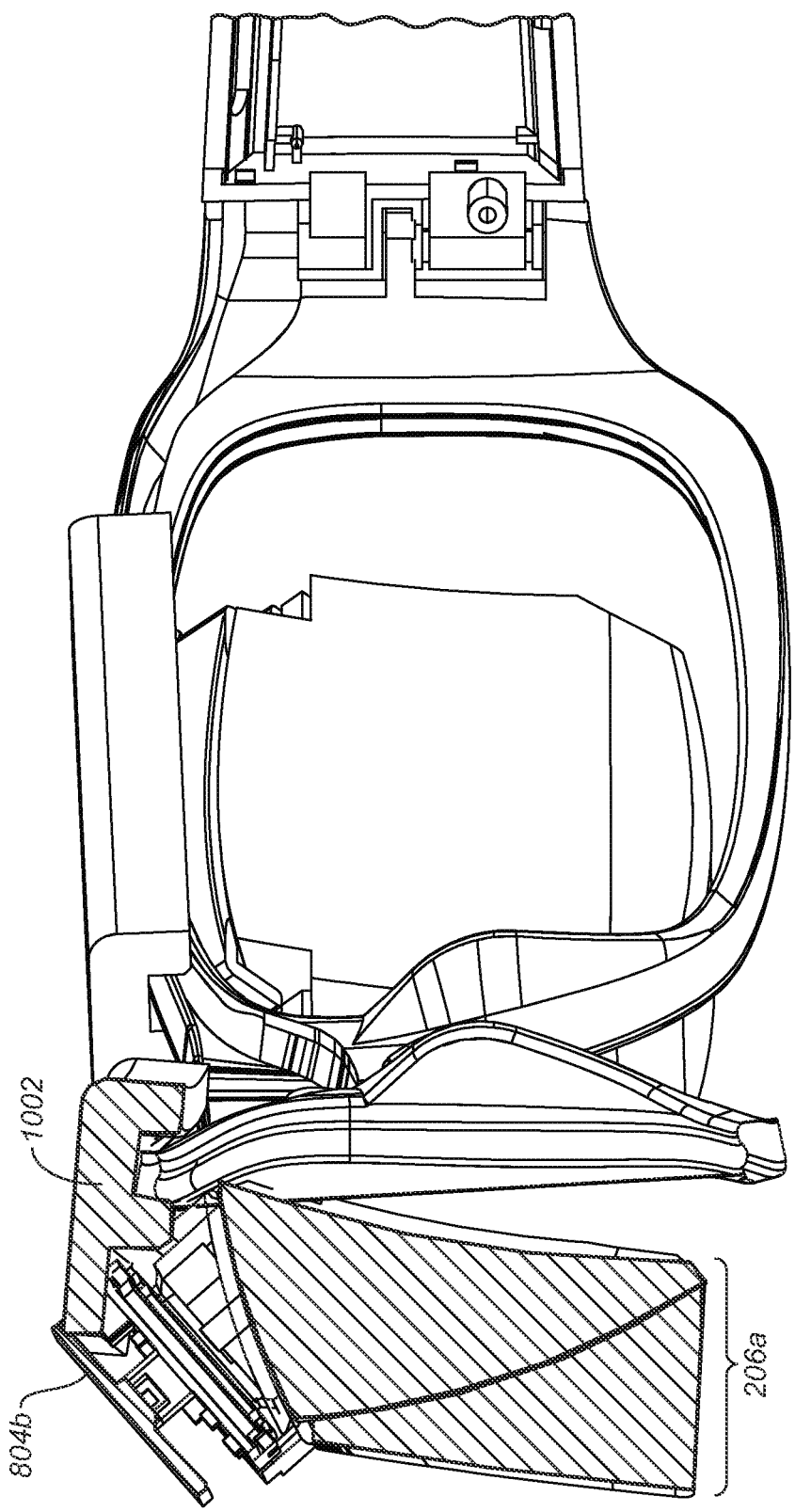
FIG. 10 is a cut view along the line 10-10 as shown in FIG. 9.

The line 10-10 in FIG. 9 is shown in cut view in FIG. 10. In FIG. 10, it is depicted that the optic system is placed in front of the glasses—to afford the user/wearer with views of the imaged being displayed on the display. It may also be seen that the display and optic system may be displaced away from the glasses and e.g., rotated above and out of the way. As may be seen, display 804*a* and/or optic system 206*a* may be coupled to hinge 1002 or the like to facilitate the movement of the display away from the user/wearer glasses—in order, e.g., provide a more unobstructed view of the real-world surroundings.

Optic System Embodiment

Figure 11:
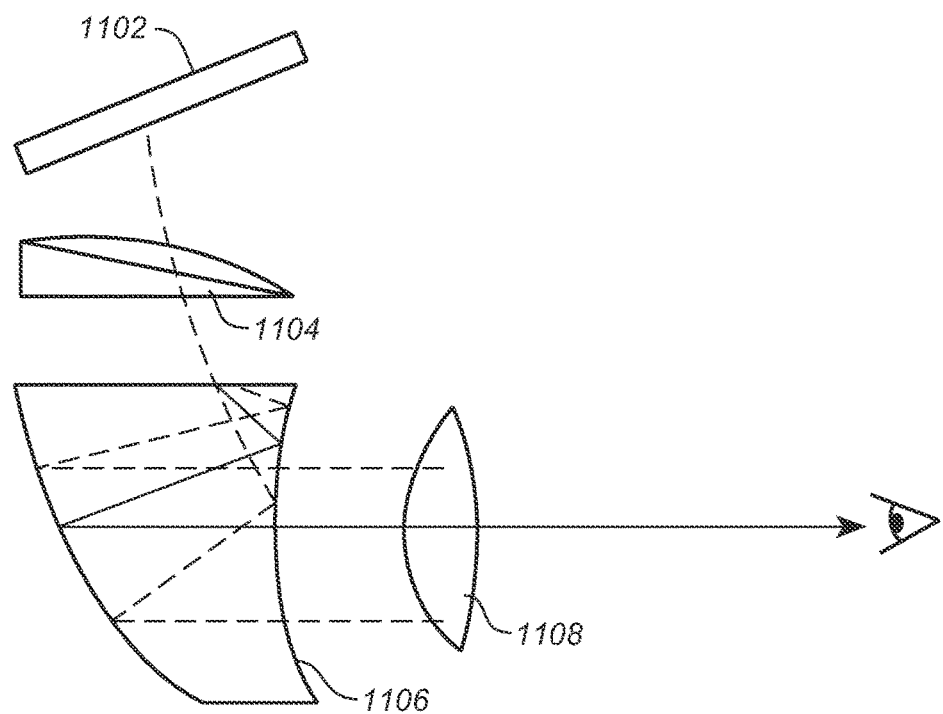
FIGS. 11 and 12 depict two embodiments of the optic system that might be employed in personal display systems in side/horizontal and top/vertical configurations respectively.

As previously mentioned, the optic system of the various embodiments of the personal display system may comprise a plurality of optical elements, in order to render a desired image to the user/wearer of the display system. FIG. 11 depicts one embodiment of such an optic system in which display 1102 provides an image to a first optical element 1104. A suitable first optical element 1104 may be pre-distorting prism or the like—that refracts the light from the display in a desired manner to a second optical element 1106. A suitable second optical element 1106 may be an imaging prism or the like. As is indicated in FIG. 11, light entering into element 1106 may be advantageously reflected off of a first (e.g., front) surface, reflected off a second (e.g., rear) surface—in such a manner as to transmit through the first surface towards the eye of the user/wearer. A third optical element, e.g. a lens, may be placed in this optical path as desired. The construction of similar optic systems may be found in U.S. Pat. No. 7,068,258, entitled "PORTABLE COMMUNICATION DEVICE WITH VIRTUAL IMAGE DISPLAY MODULE" to Cone et al. and hereby incorporated by reference.

Figure 12:
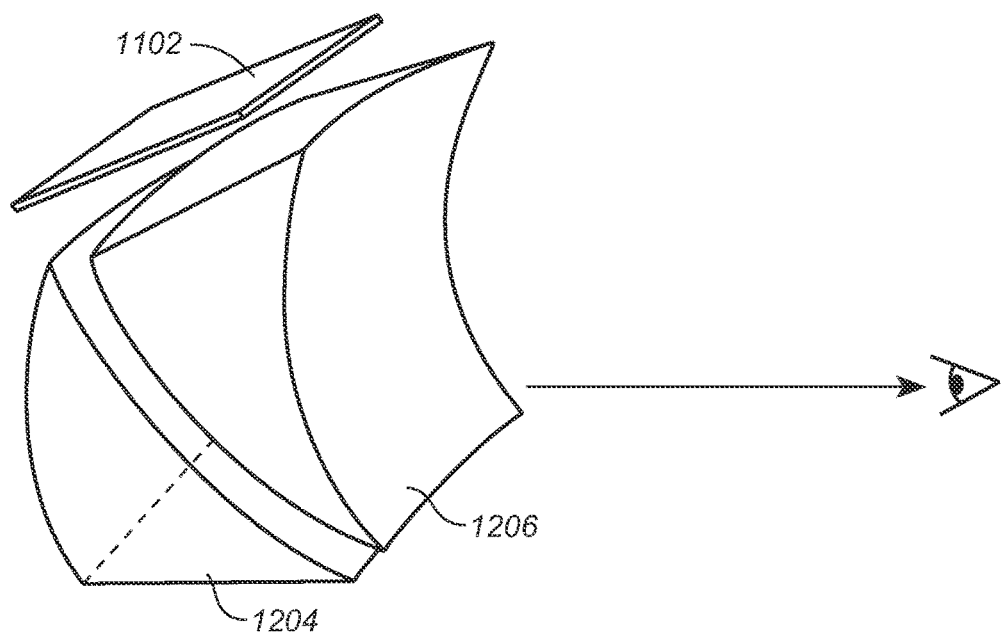

FIG. 12 show an alternative embodiment to the optic system as depicted in FIG. 11. In this embodiment, the arrangement of the display 1102 and the optic system (i.e., 1204 and 1206) may be suitable to the vertical arrangement as shown in FIGS. 8 and 9. As with FIG. 11, a series of reflections and refractions may take place in order to render an image from the display to the user, as desired.

Controller for the Personal Display System

Figure 13:
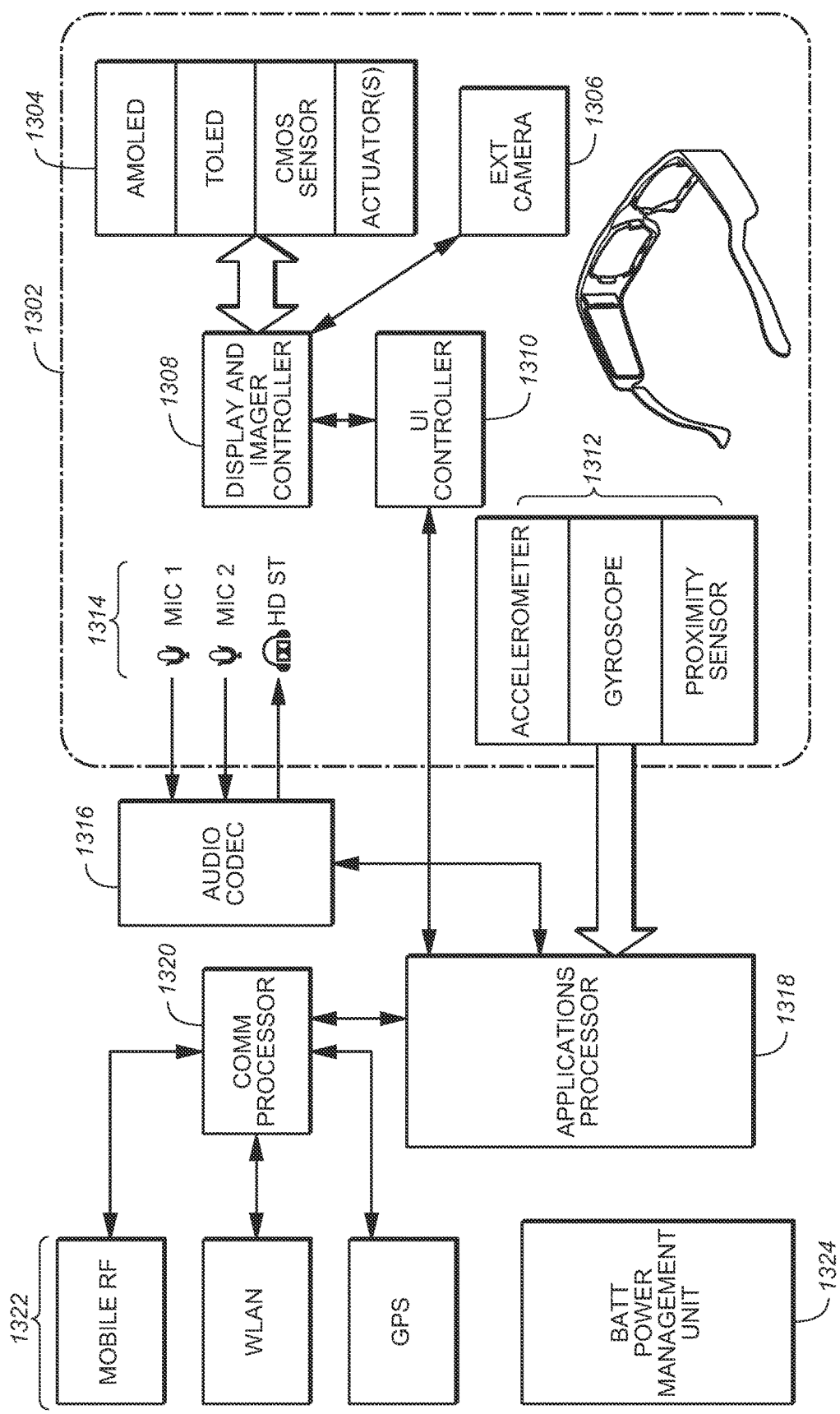
FIG. 13 depicts one embodiment of a system-level architecture for a personal display system.

FIG. 13 depicts one possible system-level architecture in block diagram form. In this embodiment, it may be possible to partition the functional blocks—either upon the personal display system itself, or off of the display system and onto devices that are in communication with the personal display.

In FIG. 13, one embodiment the features incorporated onto the personal display as shown in the area contained by dotted line 1302. Display system may comprise active optical pieces 1304, external camera 1306 (which may present user/wearer with images in the immediate surroundings, e.g., behind the user/wearer or the like), display and imager controller 1308, User Interface (UI) controller 1310, a plurality of sensors 1312 (e.g., accelerometer, gyroscope, proximity detector), a plurality of input/output devices (e.g. MIC 1 and/or 2, HD stereo headphone and the like).

Off of the personal display, other functional components may be interacting with the personal display. For example, audio codec 1316, applications processor 1318, communications processor 1320, a plurality of communications components (e.g., mobile RF, WLAN, GPS) and a battery power management unit 1324 (which may control power from a battery which may be incorporated into the personal display system (not shown).

In many embodiments, processor 1318 may send both image data signals to any display on the personal display system and, in addition, processor 1318 may send control signals to any actuator on the personal display system in order to provide the optic system and/or display with an adjustment motion. Such adjustment motion (e.g., tilt, roll, translation or the like) may be desired in order to better render the image formed by the display and intended for the user/wearer to view. In many embodiments, it may be desired that such adjustment motions may be made in response to many conditions—for example, ambient light or temperature conditions, the nature of the image formed or the like.

It will be appreciated that other embodiments and other partitions of functionality are possible and the scope of the present application encompasses all such variations.

Image Processing Embodiments

Figure 14A:
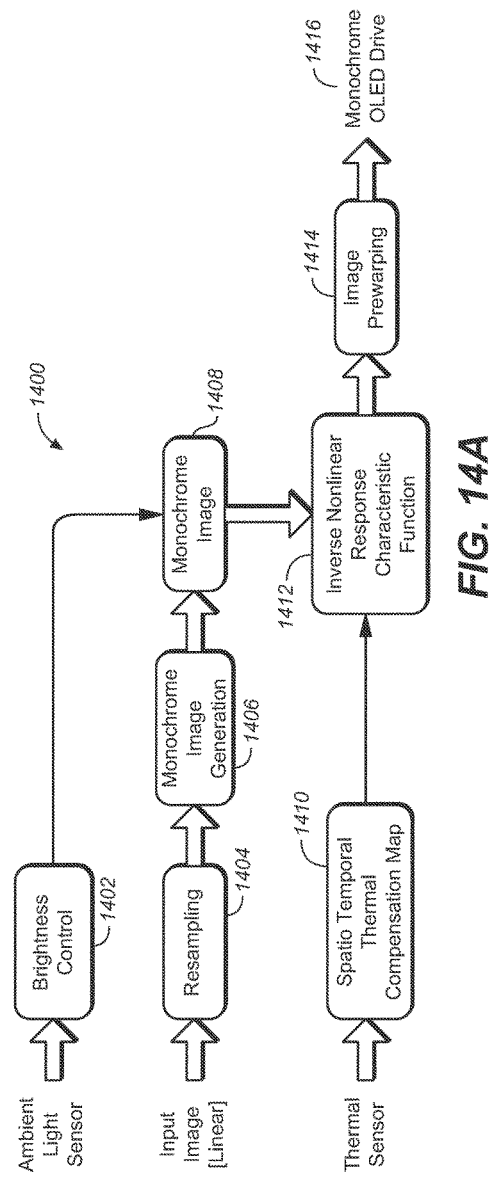
FIGS. 14A and 14B depict two embodiments of the processing flow as might occur with monochrome or color image processing respectively.
Figure 14B:
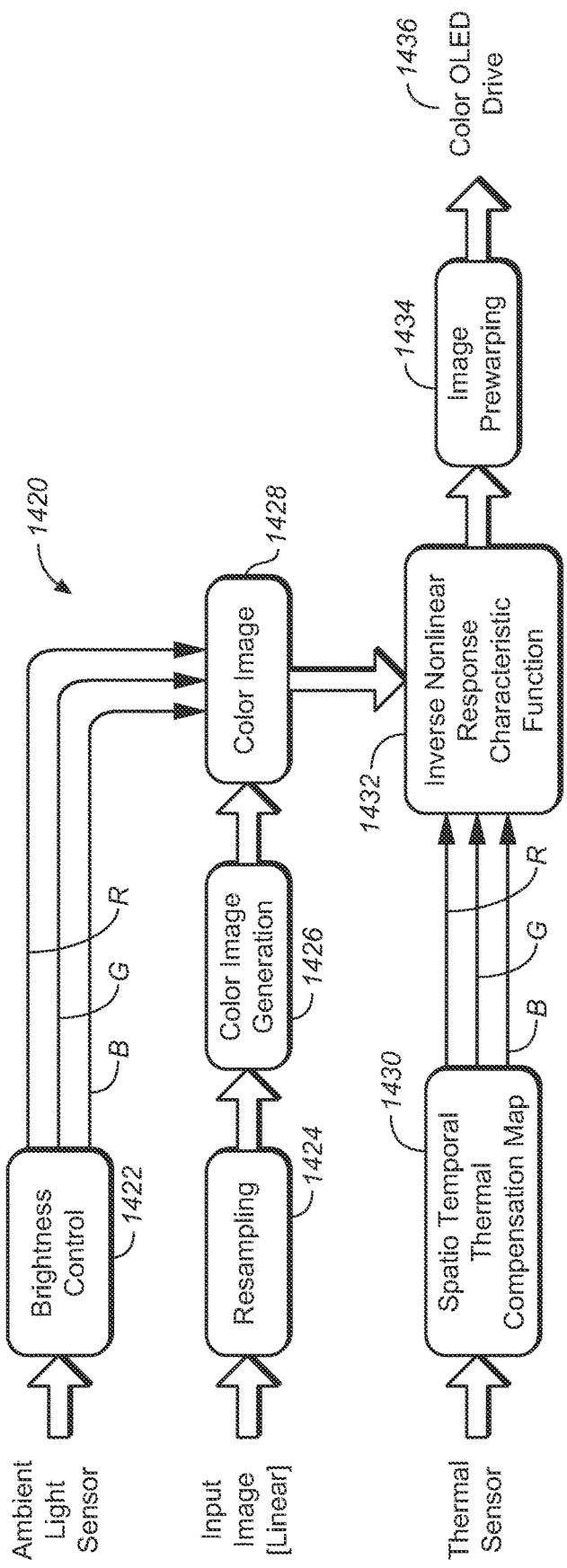

FIGS. 14A and 14B depict two flowcharts for advanced image processing modules for the various personal display system embodiments, for monochrome or color image processing respectively. As shown in FIG. 14A, processing 1400 may take as input data from an ambient light sensor. An ambient light sensor may reside anywhere upon the personal display system—e.g., on the front element or on the frame—or, alternatively, the ambient light sensor may be separate from the personal display system; but have its data sent in either a wired or wireless communications path. The amount of ambient light may inform a brightness control module 1402 (e.g., possibly running on applications processor 1318, as with the other modules shown in FIGS. 14A and 14B) to adjust the brightness of the rendered image to the user/wearer accordingly.

In addition, the image processing module may input the image data to be rendered and perform resampling in a resampling module 1404 in order to remap the input image data preferentially to be rendered upon the display(s) on the personal display system. If the image is to be rendered in monochrome, then a monochrome image generation module 1406 may make the appropriate data transformation—to adjust the luminance of the image data appropriately. Thereafter, monochrome image module 1408 may process the image data in accordance with the amount of ambient light in the environment.

The signal for such ambient light-adjusted monochrome image data may be further processed, as desired, according to the ambient temperature in the environment. A thermal sensor (e.g., either resident on the personal display system or off-board, like the ambient light sensor) may input data to a thermal compensation map module 1410. This compensation map may be input—together with the monochrome image data—to a response characteristic function 1412—which may advantageously calculate a certain amount of image prewarping 1414—in order to more accurately render the image to the user/wearer while maintaining perspective. This ambient light/temperature adjusted monochrome image data 1416 is sent as the appropriate drive signals to the display (e.g., in whatever technology it is made—e.g., OLED, LCD, LCOS or the like). In addition, the prewarping may also comprise control signals sent to any actuator resident on the personal display system—in order to perform adaptive and/or adjustment motions for the optic system in order to render the image as desired to the user/wearer.

In another embodiment that is particular to OLED displays, the incoming image might be at a native resolution that is different from the OLED display resolution. When resampled, this data may allow the system to derive the monochrome image to drive the green OLEDs. An ambient light sensor input may determine the brightness of the OLED drive and serves as a global dimming knob on the entire display. The top emitting OLEDs may have a high degree of thermal sensitivity. In addition, the variation with temperature could be distinct for each OLED in the display. Hence, we can characterize the entire OLED display's thermal sensitivity by a spatiotemporal thermal compensation map that is M×N 2D LUT where M×N is the resolution of the OLED micro-display. When compensated for the thermal variation based on the thermal sensor's output, this signal may then be fed to the response characterization function that corrects for the nonlinear response of the OLED drive thereby creating perceptually-uniform quantization steps. A nonlinear response function may be generated by nonlinear optimization on the inverse of the drive to luminance response of the OLED drive. This could be OLED specific, i.e., this curve could be Rij(Lij) where i,j is the index of the OLED and L is the expected luminance response of the OLED. Finally the image data may be pre-warped (and subsequently sent to the display) to account for the warping and/or aspherical aberration of the prismatic lenses. In addition, the control signals for any resident actuator may also be produced in order to properly render the image desired for the user/wearer.

FIG. 14B is one flowchart embodiment for the processing of color image data—e.g., in a similar manner for monochrome data processing. For example, modules 1422, 1424, 1426, 1428, 1430, 1432, 1434 and 1436 may perform in an analogous manner to the modules detailed above for monochrome; but performed appropriately for color image data. For example, image data may be maintained in its Red, Green and Blue channels, as depicted. Of course, it should be appreciated that color image data may assume other color channel embodiments, as is known in the art—and that the scope of the present application is not so limited to RGB channels.

As with the example for monochrome OLED displays above, a similar embodiment may be described for color OLED displays. The incoming image might be at a native resolution that is different from the OLED display resolution. When resampled, it may allow the system to derive the color image to drive the high resolution color OLEDs. An ambient light sensor input may determine the brightness of the OLED drive and serves as a global dimming knob on the entire display for each color primary. The top emitting OLEDs may have a high degree of thermal sensitivity. Also, the variation with temperature could be distinct for each primary of each OLED in the display. Hence, it may be desirable to characterize the entire OLED display's thermal sensitivity by a spatiotemporal thermal compensation map (possibly on a color by color channel basis) that is captured as an M×N 2D LUT where M×N is the resolution of the OLED micro-display. When compensated for the thermal variation based on the thermal sensor's output, this signal may then be fed to the response characterization function for each primary that corrects for the nonlinear response of the OLED drive thereby creating perceptually uniform quantization steps. The nonlinear response function may be generated by nonlinear optimization on the inverse of the drive to luminance response of the OLED drive. This could be OLED specific, i.e., this curve could be Rijc(Lijc) where i,j is the index of the OLED, c is the color primary and L is the expected luminance response of the OLED. Finally the image may be pre-warped to account for the warping and aspherical aberration of the prismatic lenses.

As described herein, the display system may further comprise a wide variety of sensors, such as: ambient light sensor, ambient temperature sensor, proximity detection sensor, camera, location sensor, time sensor. The data acquired by these sensors may be further processed by the processor and may thereafter send adjustment signals—either to the display (e.g., as in display image data) or to the actuators (e.g., as in adjustment control signals). In some embodiments, some adjustments may be accomplished in software—e.g., loading alternative noise canceling algorithms depending on ambient noise conditions, or adjustments may be location dependent based on Google Maps. In general, some adjustments may be physical and some are software, or in some cases both are required.

Power Efficient Proximity Detection

Figure 15:
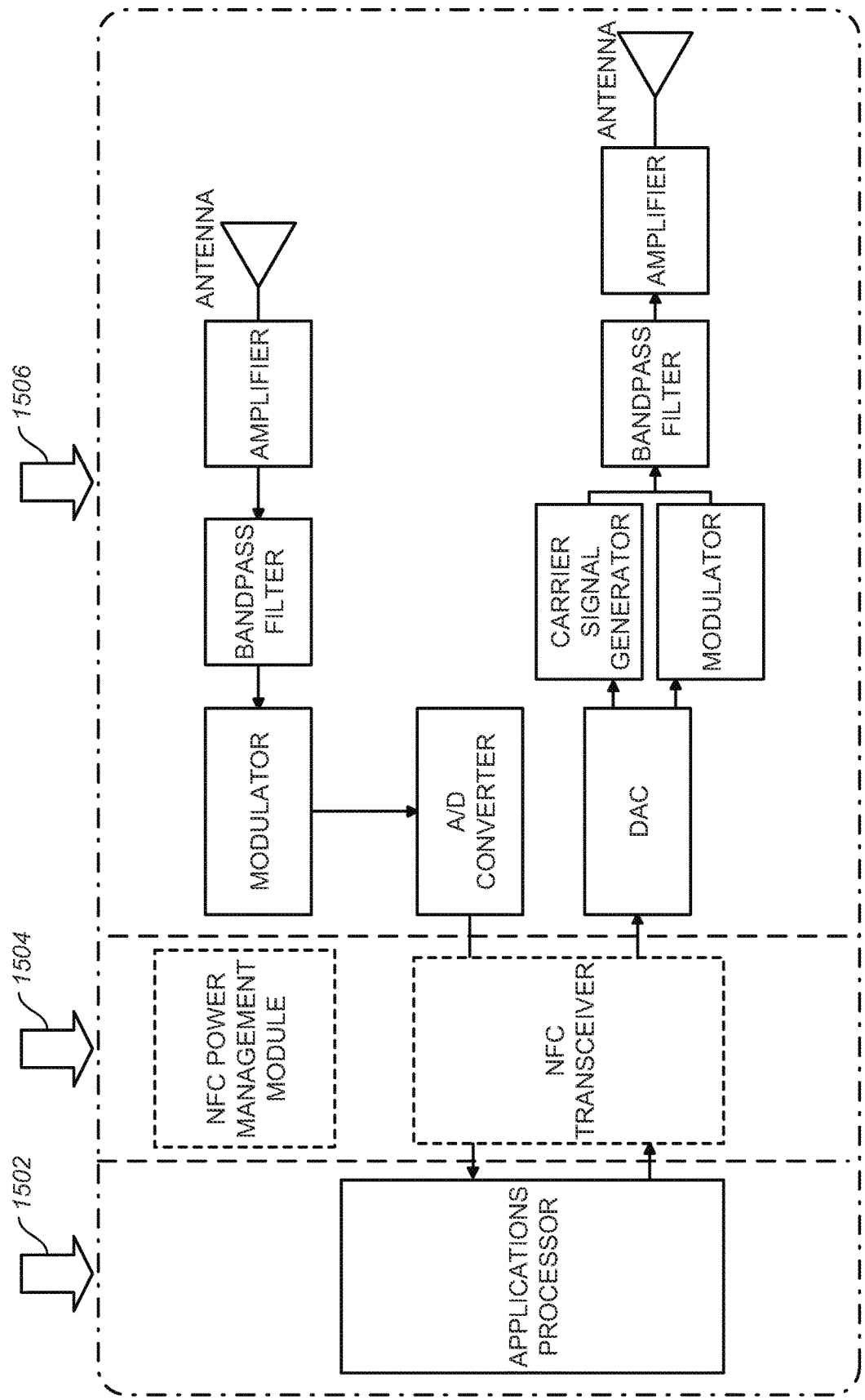
FIGS. 15 and 16 show the functional blocks of an NFC communications architecture and, possibly as mapped onto the system architecture of FIG. 13, respectively.
Figure 16:
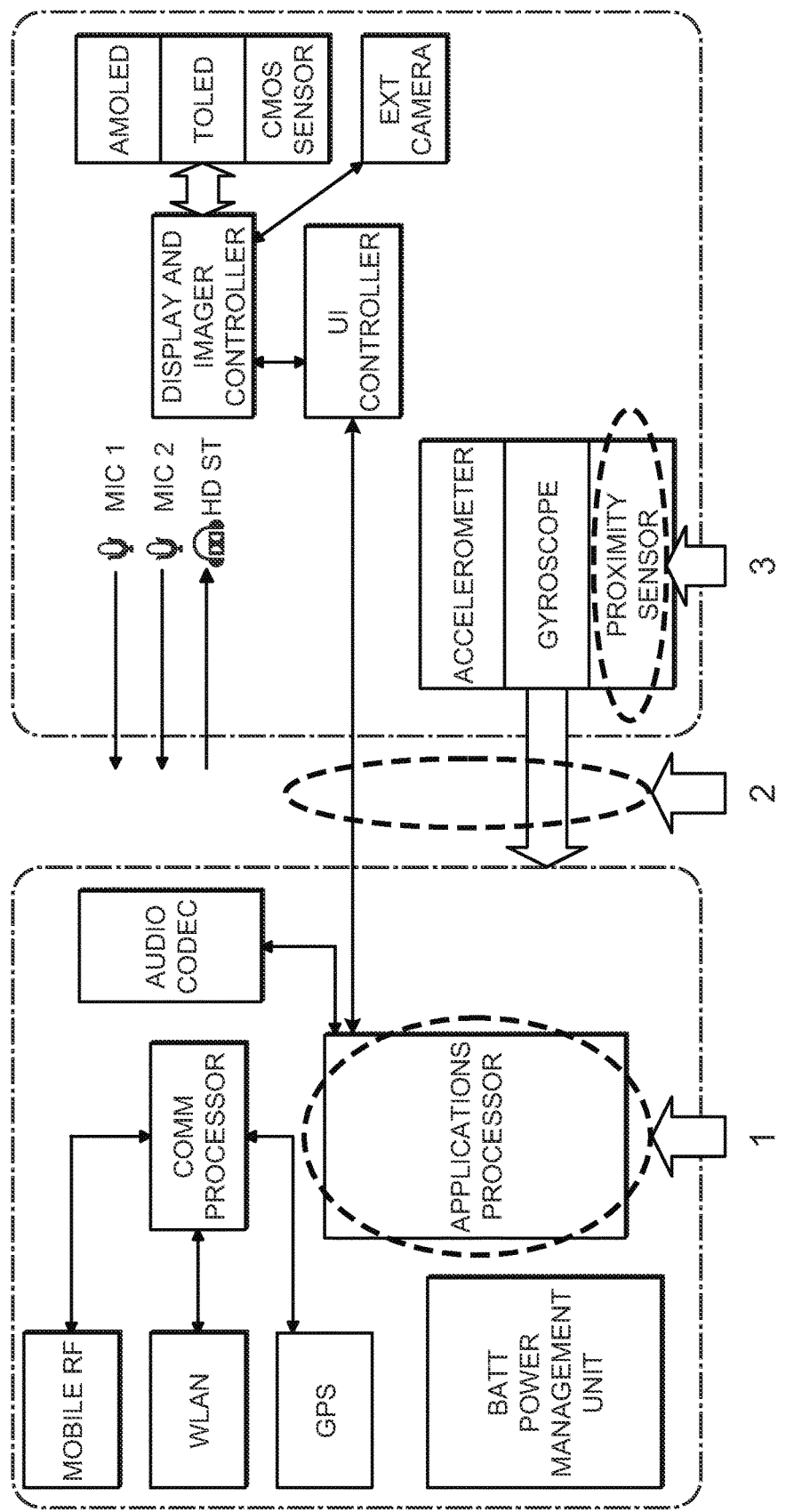

FIGS. 15 and 16 depict how proximity sensing may be implemented on the eyewear device along with a low power wireless data transmission via Near Field Communication (NFC). FIG. 15 is a block diagram depicting an application where signals are sent and received by a proximity sensor, possibly, e.g., mounted on the rear of the frame near the temple. Broadly, the proximity sensing may be effected by application processor 1502, NFC transceiver and power management modules 1504 and the transmitter and/or receiver modules, as shown in block 1506. FIG. 16 shows how these blocks 1502, 1504 and 1506 may be mapped onto the system architecture (e.g., as perhaps depicted in FIG. 13)—as labeled 1, 2 and 3 in FIG. 16 respectively In one embodiment, multiband transmitters and receivers could be used to collect data from nearby objects such as location, velocity and trajectory. Returned signals are conditioned and transferred to the NFC module for wireless transmission to the applications processor. One scenario would contain both the NFC and the Applications Processor 1502 on the eyewear device. In a second embodiment, the NFC module resides on the eyewear device and communicate with a portable device such as a smart mobile phone where processing of data is accomplished. In another embodiment, said Application Processor 1502 resides in a local or cloud-based network.

Figure 17:
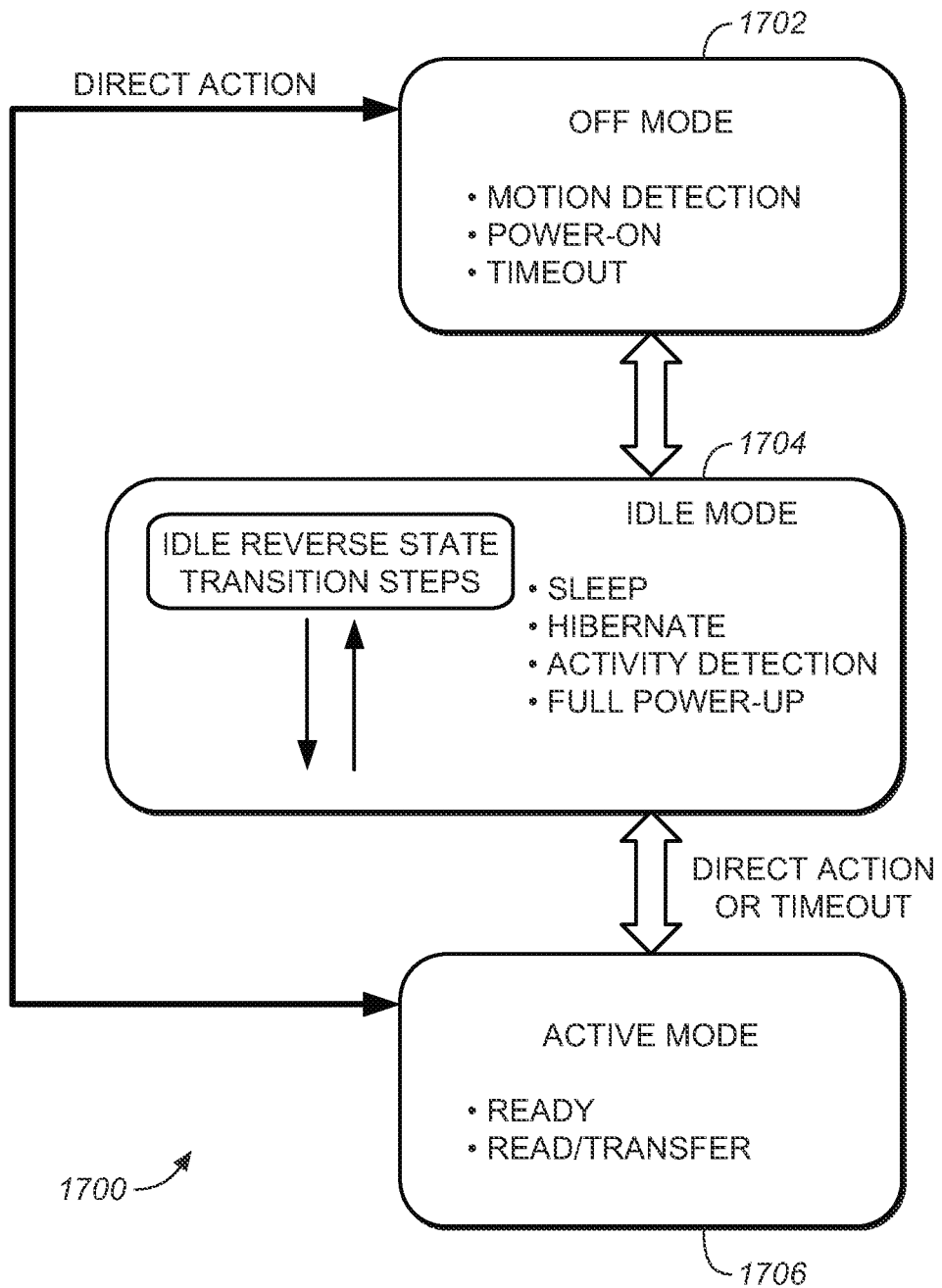
FIG. 17 depicts one embodiment of a processing flowchart to affect power savings on a personal display system.

FIG. 17 depicts possible operating models and power management scheme of the device such that optimal battery power usage can be achieved. For example, if there is no detectable motion, the glasses may get into hibernation/idle 1704 mode and then possibly, a sleep/off mode 1702. The reverse arrows are shown from active mode to both off mode (through an action or time out) and idle mode (through an action, message or time out). Idle mode should also have a reverse state transition to off mode (through a timeout) Power management circuitry also incorporates NFC wireless charging methodology. As direct action and/or movement is detected, the system may transition to an active mode 1706.

A detailed description of one or more embodiments of the invention, read along with accompanying figures, that illustrate the principles of the invention has now been given. It is to be appreciated that the invention is described in connection with such embodiments, but the invention is not limited to any embodiment. The scope of the invention is limited only by the claims and the invention encompasses numerous alternatives, modifications and equivalents. Numerous specific details have been set forth in this description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The invention claimed is:

1. A method for providing pre-warping image data signals by a processor to be sent to a personal display for a user to receive images to be rendered, steps of said method comprising:
   inputting image data to be rendered to said user;
   sensing ambient light conditions;
   calculating a brightness level for the resulting image to be rendered to said user;
   resampling said input image data to be rendered upon said display;
   sensing ambient temperature conditions;
   applying a non-linear response function, the function compensating for variations in the backlight drive performance according to changes in said ambient temperature conditions; and
   pre-warping said image by sending control signals to an actuator to perform adjustment motions, the pre-warping performed in accordance with the non-linear response function according to said ambient temperature condition.

2. The method as recited in claim 1 wherein said display is one of a group, said group comprising: a monochrome OLED display and a colored OLED display.

3. The method as recited in claim 1 wherein the step of pre-warping said image data further comprises the step of accounting for warping or aberration of said optic system.

4. The method as recited in claim 1 wherein said display system further comprises a set of sensors, said sensors comprising one of a group, said group comprising: ambient light sensor, ambient temperature sensor, proximity detection sensor, camera, location sensor, time sensor.

5. The method as recited in claim 4 wherein the steps of said method further comprises:
   sending adjustment signals to said display, based upon the data acquired by one of said sensors.

6. The method as recited in claim 4 wherein the steps of said method further comprises:
   adjusting control software of said display system, based upon conditions of said display system.

7. The method as recited in claim 4 wherein said display system further comprises a set of actuators, said actuators capable of providing adjustment motions to said optic system, and wherein the steps of said method further comprises:
   sending adjustment signals to said actuators, based upon the control signals sent from said processor.

* * * * *